(12) United States Patent
    Rodgers

(10) Patent No.:    US 12,691,635 B2
(45) Date of Patent:        Jul. 28, 2026

(54) APPARATUS, SYSTEM AND METHOD OF COMBINING ADDITIVE MANUFACTURING PRINT TYPES

(71) Applicant: 3D Print Innovations, LLC, Millburn, NJ (US)

(72) Inventor: Luke Rodgers, St. Petersburg, FL (US)

(73) Assignee: 3D Print Innovations, LLC

( * ) Notice:    Subject to any disclaimer, the term of this patent is extended or adjusted under 35 U.S.C. 154(b) by 123 days.

(21) Appl. No.:    17/417,092

(22) PCT Filed:    Dec. 19, 2019

(86) PCT No.:    PCT/US2019/067578
    § 371 (c)(1),
    (2) Date:    Jun. 21, 2021

(87) PCT Pub. No.:    WO2020/132300
    PCT Pub. Date: Jun. 25, 2020

(65)        Prior Publication Data
    US 2022/0080655 A1        Mar. 17, 2022

Related U.S. Application Data

(60)    Provisional application No. 62/782,794, filed on Dec. 20, 2018, provisional application No. 62/782,729, filed on Dec. 20, 2018.

(51) Int. Cl.
    B29C 64/209        (2017.01)
    B29C 64/264        (2017.01)
    B33Y 30/00        (2015.01)
(52) U.S. Cl.
    CPC .......... B29C 64/209 (2017.08); B29C 64/264 (2017.08); B33Y 30/00 (2014.12)

(58) Field of Classification Search
    CPC ... B29C 64/209; B29C 64/264; B29C 64/118; B29C 64/188; B29C 64/336;
            (Continued)

(56)        References Cited

U.S. PATENT DOCUMENTS 5,738,817 A * 4/1998 Danforth ........... C04B 35/62695
                                        419/36
    5,740,051 A * 4/1998 Sanders, Jr. .......... B29C 64/106
                                        347/1
        (Continued)

FOREIGN PATENT DOCUMENTS

CN        207549495        6/2018
    EP        2699406 A2 *    2/2014    ......... B29C 35/0805
        (Continued)

OTHER PUBLICATIONS

EPO. "Search Opinion for EP 19900913". EPO. ESpacenet. 2023 (Year: 2023).*
        (Continued)

*Primary Examiner* — Susan D Leong
    *Assistant Examiner* — Jonathan B Woo
    (74) *Attorney, Agent, or Firm* — Riverside Law LLP

(57)        ABSTRACT

An apparatus, system and method of additive manufacturing. The apparatus, system and method include at least: a rastering print head suitable to print an outer contour for the additive manufacturing print; a secondary print head suitable to print infrared-actuated print material within the outer contour; and an infrared actuator, suitable to flow the infrared-actuated print material within the outer contour.

3 Claims, 3 Drawing Sheets

(58) Field of Classification Search

CPC ..... B29C 64/00; B29C 64/282; B29C 64/295; B33Y 30/00; B33Y 10/00

See application file for complete search history.

(56) References Cited

U.S. PATENT DOCUMENTS

| | | | | |
|---|---|---|---|---|
| 6,051,179 | A | 4/2000 | Hagenau | |
| 6,767,499 | B1 | 7/2004 | Hory | |
| 10,661,514 | B2 | 5/2020 | Talgorn | |
| 10,710,301 | B2 * | 7/2020 | Feng | B33Y 30/00 |
| 10,717,265 | B2 | 7/2020 | Ng | |
| 11,084,227 | B2 * | 8/2021 | Yui | B22F 10/385 |
| 11,254,068 | B2 * | 2/2022 | Ng | B29C 64/165 |
| 2014/0036455 | A1 | 2/2014 | Eduardo | |
| 2014/0043630 | A1 | 2/2014 | Buser | |
| 2015/0174824 | A1 | 6/2015 | Gifford et al. | |
| 2015/0190967 | A1 | 7/2015 | Stava et al. | |
| 2015/0266238 | A1 * | 9/2015 | Ederer | B29C 64/364 |
| | | | | 425/174 |
| 2015/0273769 | A1 | 10/2015 | Korn | |
| 2016/0137838 | A1 | 5/2016 | Rolland | |
| 2016/0311165 | A1 | 10/2016 | Mark et al. | |
| 2017/0037674 | A1 | 2/2017 | Hooper et al. | |
| 2017/0120332 | A1 | 5/2017 | Demuth | |
| 2017/0129012 | A1 | 5/2017 | Ishida | |
| 2017/0165920 | A1 * | 6/2017 | Leavitt | B29C 64/118 |
| 2017/0176976 | A1 * | 6/2017 | Burton | B33Y 80/00 |
| 2017/0225390 | A1 | 8/2017 | Napadensky | |
| 2017/0239719 | A1 | 8/2017 | Buller | |
| 2017/0266883 | A1 * | 9/2017 | Yuji | B29C 64/386 |
| 2017/0274595 | A1 * | 9/2017 | Swartz | B29C 64/165 |
| 2018/0001550 | A1 | 1/2018 | Zhao | |
| 2018/0111313 | A1 * | 4/2018 | Murao | B29C 64/112 |
| 2018/0154438 | A1 | 6/2018 | Mark | |
| 2018/0154439 | A1 * | 6/2018 | Mark | B29C 64/00 |
| 2018/0186075 | A1 | 7/2018 | Hierro Domenech | |
| 2018/0200957 | A1 | 7/2018 | Krüger | |
| 2018/0297272 | A1 | 10/2018 | Preston | |
| 2018/0319082 | A1 | 11/2018 | Barnes | |
| 2018/0345376 | A1 | 12/2018 | Page | |
| 2019/0047216 | A1 * | 2/2019 | Emamjomeh | B33Y 10/00 |
| 2019/0054689 | A1 | 2/2019 | Rudisill | |
| 2021/0154770 | A1 * | 5/2021 | Alf | C22C 1/0425 |
| 2021/0197485 | A1 * | 7/2021 | Woodlock | B29C 64/153 |

FOREIGN PATENT DOCUMENTS

| | | | | |
|---|---|---|---|---|
| EP | 2699406 | B1 * | 2/2020 | ........ B29C 35/0805 |
| JP | H10323906 | | 12/1998 | |
| WO | WO-2012143923 | A2 * | 10/2012 | ........ B29C 35/0805 |
| WO | 2017050388 | A1 | 3/2017 | |
| WO | 2017052682 | A1 | 3/2017 | |
| WO | 2017131764 | A1 | 8/2017 | |

OTHER PUBLICATIONS

EPO. "Supplementary Search Report for EP 19900913". EPO. ESpacenet. 2023 (Year: 2023).*

EPO. "EP 4647256 European search opinion". Jan. 14, 2026 EPO. Espacenet. (Year: 2026).*

International Search Report for PCT/US2019/067578, dated Jun. 25, 2020.

Written Opinion of the International Searching Authority for PCT/US2019/067578, dated Jun. 25, 2020.

Ankno, T. "Machine Translation of JPH10323906A: Optical Shaping Device using Lamp." EPO. Espacenet. 2023 (Year: 2023) 8 pages.

Extended European Search Report issued in App. No. EP23199598, dated Oct. 9, 2023, 8 pages.

International Search Report for PCT/US2019/067219, dated Jun. 25, 2020. 3 pages.

Jérémie Dumas et, "Bridging the gap: automated steady scaffoldings for 3D printing", ACM Transactions on Graphics, vol. 33, No. 4, pp. 1-10, 2014.

Office Action (Final Rejection) dated Oct. 23, 2023 for U.S. Appl. No. 17/417,054 (pp. 1-14).

Written Opinion of the International Searching Authority for PCT/US2019/067219, dated Jun. 25, 2020. 3 pages.

EPO Communication pursuant to Article 94(3) issued in App. No. EP23199598, dated May 29, 2024, 5 pages.

Office Action (Non-Final Rejection) dated Apr. 18, 2024 for U.S. Appl. No. 17/417,054 (pp. 1-12).

1 Office Action (Final Rejection) dated Sep. 3, 2024 for U.S. Appl. No. 17/417,054 (pp. 1-22).

1 Office Action (Non-Final Rejection) dated Mar. 12, 2025 for U.S. Appl. No. 17/417,054 (pp. 1-29).

* cited by examiner

APPARATUS, SYSTEM AND METHOD OF COMBINING ADDITIVE MANUFACTURING PRINT TYPES

CROSS-REFERENCE TO RELATED APPLICATIONS

The present application claims benefit of priority to International Application No. PCT/US2019/067578, filed Dec. 19, 2019, entitled: "Apparatus, System and Method of Combining Additive Manufacturing Print Types," which claims priority to U.S. Provisional Application No. 62/782,794, filed Dec. 20, 2018, entitled: "Apparatus, System and Method of Combining Additive Manufacturing Print Types," and U.S. Provisional Application No. 62/782,729, filed Dec. 20, 2018, entitled: Apparatus, System and Method of Heat Filtering for Additive Manufacturing," the entireties of which is incorporated herein by reference as if set forth in its entireties.

BACKGROUND

Field of the Disclosure

The present disclosure relates to additive manufacturing, and, more specifically, to an apparatus, system and method of combining additive manufacturing print types.

Description of the Background

Three-dimensional (3D) printing is any of various processes in which material is joined or solidified under computer control to create a three-dimensional object. The 3D print material is "added" onto a base, such as in the form of added liquid molecules or layers of powder grain or melted feed material, and upon successive fusion of the print material to the base, the 3D object is formed. 3D printing is thus a subset of additive manufacturing (AM).

A 3D printed object may be of almost any shape or geometry, and typically the computer control that oversees the creation of the 3D object executes from a digital data model or similar additive manufacturing file (AMF) file, i.e., a "print plan". Usually this AMF is executed on a layer-by-layer basis, and may include control of other hardware used to form the layers, such as lasers or heat sources.

There are many different technologies that are used to execute the AMF. Exemplary technologies may include: fused deposition modeling (FDM); stereolithography (SLA); digital light processing (DLP); selective laser sintering (SLS); selective laser melting (SLM); high speed sintering (HSS); inkjet print and/or particle jetting manufacturing (IPM); laminated object manufacturing (LOM); and electronic beam melting (EBM).

Some of the foregoing methods melt or soften the print material to produce the print layers. For example, in FDM, the 3D object is produced by extruding small beads or streams of material which harden to form layers. A filament of thermoplastic, wire, or other material is fed into an extrusion nozzle head, which typically heats the material and turns the flow on and off.

Other methods, such as laser or similar beam-based or sintering techniques, may heat or otherwise activate the print material, such as a print powder, for the purpose of fusing the powder granules into layers. For example, such methods may melt the powder using a high-energy laser to create fully dense materials that may have mechanical properties similar to those of conventional manufacturing methods.

SLS, for example, uses a laser to solidify and bond grains of plastic, or composite materials into layers to produce the 3D object. The laser traces the pattern of each layer slice into the bed of powder, the bed then lowers, and another layer is traced and bonded on top of the previous.

In contrast, other similar methods, such as IPM, may create the 3D object one layer at a time by spreading a layer of powder, and printing a binder in the cross-section of the 3D object. This binder may be printed using an inkjet-like process.

By way of further example, and as will be appreciated by the skilled artisan, high speed sintering (HSS) employs part formation through the use of heating lamps, such as infrared (IR) lamps. More specifically, a part for production is, virtually-speaking, "sliced" into layers in the print plan, as discussed throughout, and these virtual layers then become actual layers upon application of the IR by the print process to the treated areas of a print bed.

That is, HSS typically occurs using a "bed" of powdered print material. The print plan may select one or more locations within the powder bed that will serve as part generation locations. Each part layer is "printed" onto the part generation pattern in the powder bed using a heat-absorbing ink. In a typical process, a broadband IR lamp then delivers heat across the entire print bed. This heat is absorbed by the heat absorbing ink, thereby forming a part layer having only those shaped characteristics indicated by the pattern of the ink placed upon the powder bed, as referenced above.

The foregoing process then repeats, layer by layer, until the completed part is formed. The HSS process accordingly allows for highly refined designs that may allow for internal movement and similar interactions, even between internal aspects of a given part. Moreover, to allow for such refined patterning, an anti-heat agent, such as water, may also be placed at selected locations about the print boundaries for a given layer pattern, so as to prevent undesired absorption of heat by those layers and a consequent malformation of the part.

In accordance with the foregoing, part characteristics in HSS may be varied layer by layer, or even within layers, such as based on the inks used and/or the level of heat applied. Yet further, an entire bed may be used to create individual layer patterns for many parts with each single pass of the IR lamp across the print powder bed.

SUMMARY

The embodiments are and include at least an apparatus, system and method of additive manufacturing. The apparatus, system and method include at least: a rastering print head suitable to print an outer contour for the additive manufacturing print; a secondary print head suitable to print infrared-actuated print material within the outer contour; and an infrared actuator, suitable to flow the infrared-actuated print material within the outer contour.

BRIEF DESCRIPTION OF THE DRAWINGS

The disclosed non-limiting embodiments are discussed in relation to the drawings appended hereto and forming part hereof, wherein like numerals indicate like elements, and in which.

DETAILED DESCRIPTION

Figure 1:
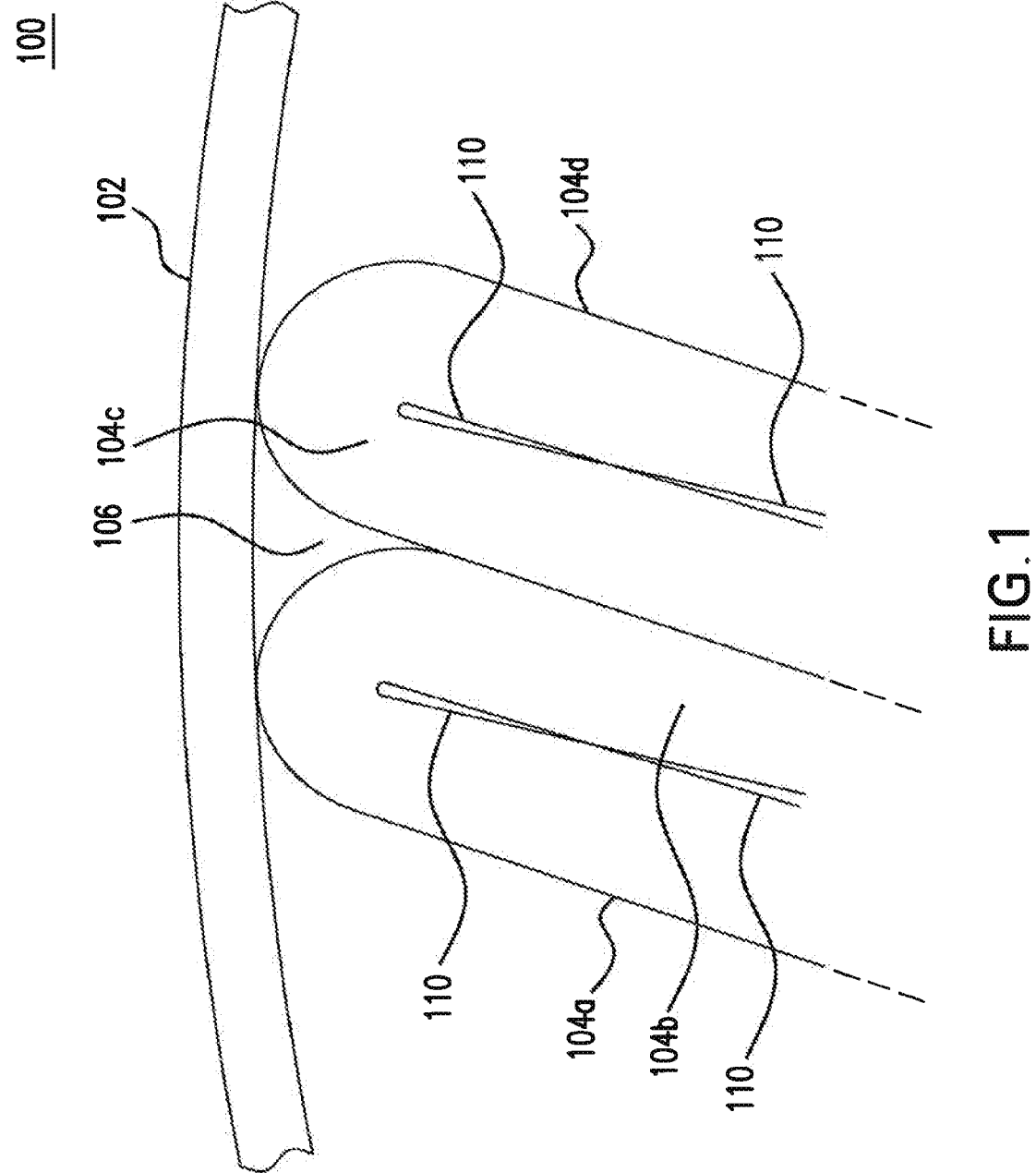
FIG. 1 is an illustration of a print system.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to" or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

The disclosed apparatus, system and method provide a print methodology that combines aspects of FDM and HSS printing. More specifically, it is typical of FDM printing, as discussed above, that, to the extent a "filled" part layers to be created, an outer contour is first laid, and then a plurality of print beads are rastered within the outer contour. This is illustrated with respect to FIG. 1.

As shown in the FDM print 100 of FIG. 1, an outer contour print bead 102 is provided, and a plurality of inter-bead raster runs 104a, b, c, d, are abutted against one another within the outer contour for a given print layer. As shown, this type of FDM print is typically subjected to edge gaps 106 between raster runs 104a, b, c, d, and along the outer contour 102, and undesirably large gaps 110 between rastered runs 104a, b, c, d, particularly adjacent the turn-around point for the FDM print head. Unfortunately, the referenced edge gaps 106, and turnaround gaps and intra-run gaps 110, form weak spots within the formed part. These weakened spots may lead to cracking, breakage, or part malformation and can also lead to lower than desired physical properties such as reduced elongation at break, strength, and modulus.

Figure 2:
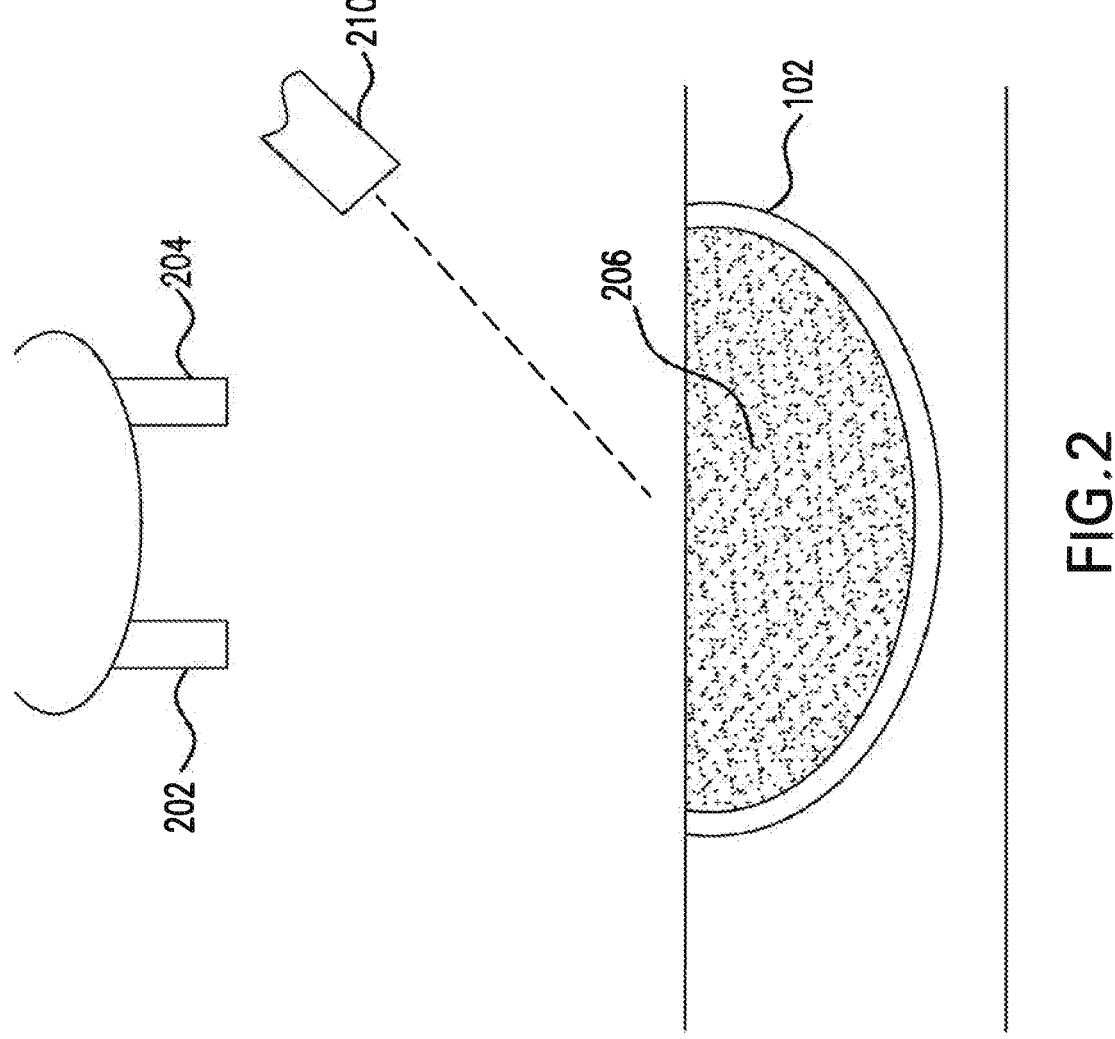
FIG. 2 is an illustration of a print system.

Consequently and as illustrated in FIG. 2, the disclosed print system may use two printer types, namely an FDM outer contour print head 202, and a printer 204 for IR-actuated material. Of note, the IR printer as used herein references any printer type for which the print material 206 may be heated and/or actuated by an IR lamp such that the actuated print material will flow a given amount. Of note, the flowed IR print material 206 may be subjected to an IR actuating agent by printer 204, or may simply be formed by a material that is printed (such as an IR-sensitive FDM material) by printer 204 and is flowed responsive to a given wavelength or wavelengths of an IR lamp.

As further illustrated in FIG. 2, the first FDM print head 202 may provide an outer contour 102 in a manner similar to that discussed above with respect to FIG. 1. The second print head 204 may provide print material 206 within the outer contour that is actuated by the IR lamp 210 shown in FIG. 2. Thereby, the IR responsive material 206 within the outer contour 102 may be actuated, such as through the use of a dispersed IR-actuated agent on print material 206 or based on heat responsiveness of the rastered FDM print material 206. Upon actuation of the inner-printed material 206, the inner-printed material 206 may modify its shape, such as by flowing to fill the gaps and/or cracks referenced above in the discussion of FIG. 1. Thereby, the part formed in FIG. 2 largely eliminates the edge gap 106 and turnaround and intra-run gaps 110 discussed above, thereby providing a stronger, more durable, and/or more functional output part.

Moreover, the use of an outer contour in the embodiments may substantially or completely avoid the need for an anti-heat agent along the outer contour of each part layer. By way of non-limiting example, water maybe unnecessary for disbursement along the outer contours of the formed part, at least because the contours of the part will be physically defined by the printing of the outer contour discussed herein.

Figure 3:
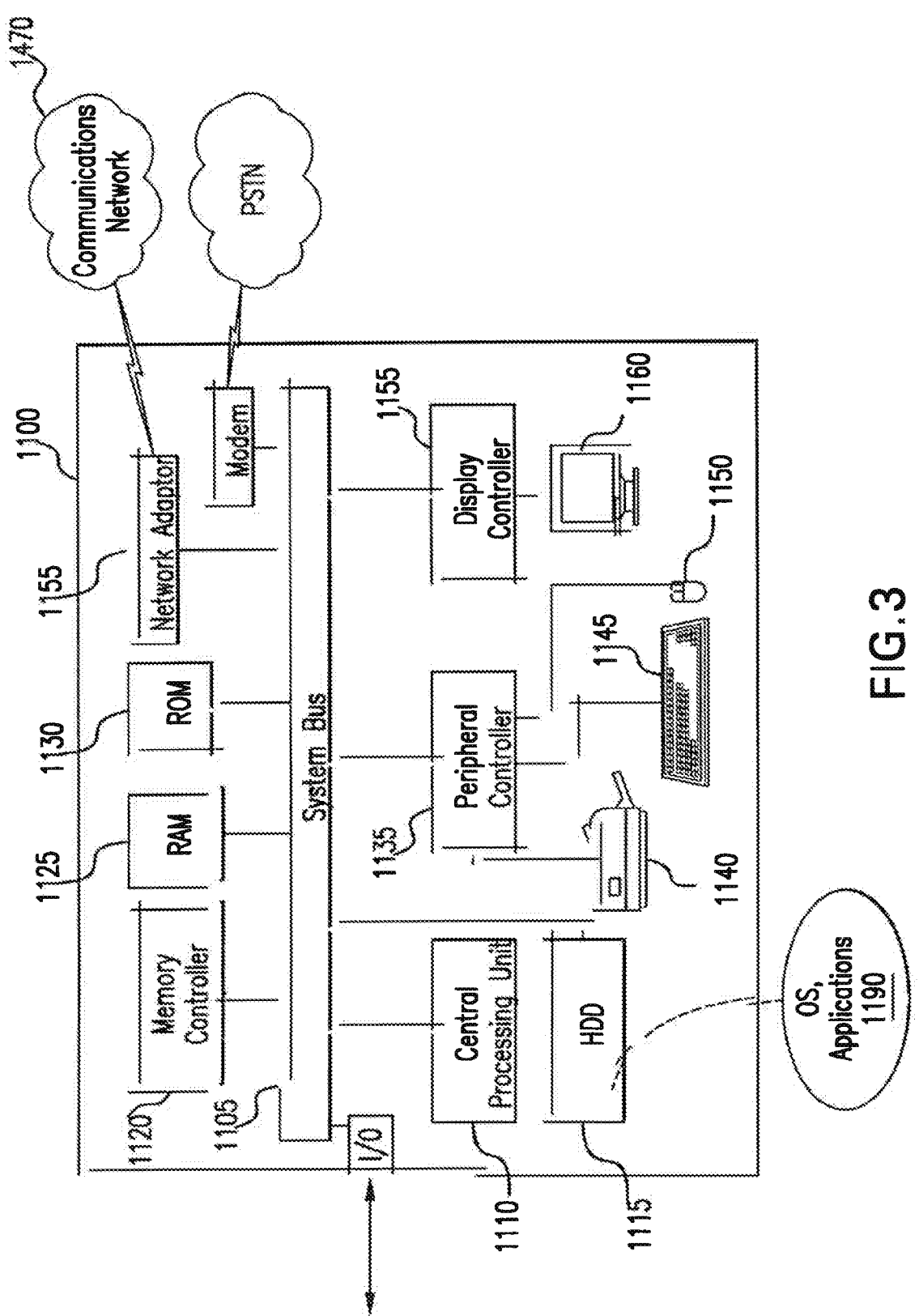
FIG. 3 illustrates an exemplary computing system.

FIG. 3 depicts an exemplary computing and control system 1100 for use in association with the herein described systems and methods. Computing system 1100 is capable of executing software, such as an operating system (OS) and/or one or more computing applications/algorithms 1190, such as applications applying the print plan, monitoring, process controls, process monitoring, and process modifications discussed herein, and may execute such applications 1190 using data, such as materials and process-related data, which may be stored 1115 locally or remotely.

More particularly, the operation of an exemplary computing system 1100 is controlled primarily by computer readable instructions, such as instructions stored in a computer readable storage medium, such as hard disk drive (HDD) 1115, optical disk (not shown) such as a CD or DVD, solid state drive (not shown) such as a USB "thumb drive," or the like. Such instructions may be executed within central processing unit (CPU) 1110 to cause computing system 1100 to perform the operations discussed throughout. In many known computer servers, workstations, personal computers, and the like, CPU 1110 is implemented in an integrated circuit called a processor.

It is appreciated that, although exemplary computing system 1100 is shown to comprise a single CPU 1110, such description is merely illustrative, as computing system 1100 may comprise a plurality of CPUs 1110. Additionally, computing system 1100 may exploit the resources of remote CPUs (not shown), for example, through communications network 1170 or some other data communications means.

In operation, CPU 1110 fetches, decodes, and executes instructions from a computer readable storage medium, such as HDD 1115. Such instructions may be included in software, such as an operating system (OS), executable programs such as the aforementioned correlation applications, and the like. Information, such as computer instructions and other computer readable data, is transferred between components of computing system 1100 via the system's main data-transfer path. The main data-transfer path may use a system bus architecture 1105, although other computer architectures (not shown) can be used, such as architectures using serializers and deserializers and crossbar switches to communicate data between devices over serial communication paths. System bus 1105 may include data lines for sending data, address lines for sending addresses, and control lines for sending interrupts and for operating the system bus. Some busses provide bus arbitration that regulates access to the bus by extension cards, controllers, and CPU 1110.

Memory devices coupled to system bus 1105 may include random access memory (RAM) 1125 and/or read only memory (ROM) 1130. Such memories include circuitry that allows information to be stored and retrieved. ROMs 1130 generally contain stored data that cannot be modified. Data stored in RAM 1125 can be read or changed by CPU 1110 or other hardware devices. Access to RAM 1125 and/or ROM 1130 may be controlled by memory controller 1120. Memory controller 1120 may provide an address translation function that translates virtual addresses into physical addresses as instructions are executed. Memory controller 1120 may also provide a memory protection function that isolates processes within the system and isolates system processes from user processes. Thus, a program running in user mode may normally access only memory mapped by its own process virtual address space; in such instances, the program cannot access memory within another process' virtual address space unless memory sharing between the processes has been set up.

In addition, computing system 1100 may contain peripheral communications bus 1135, which is responsible for communicating instructions from CPU 1110 to, and/or receiving data from, peripherals, such as peripherals 1140, 1145, and 1150, which may include printers, keyboards, and/or the sensors discussed herein throughout. An example of a peripheral bus is the Peripheral Component Interconnect (PCI) bus.

Display 1160, which is controlled by display controller 1155, may be used to display visual output and/or other presentations generated by or at the request of computing system 1100, such as in the form of a GUI, responsive to operation of the aforementioned computing program(s). Such visual output may include text, graphics, animated graphics, and/or video, for example. Display 1160 may be implemented with a CRT-based video display, an LCD or LED-based display, a gas plasma-based flat-panel display, a touch-panel display, or the like. Display controller 1155 includes electronic components required to generate a video signal that is sent to display 1160.

Further, computing system 1100 may contain network adapter 1165 which may be used to couple computing system 1100 to external communication network 1470, which may include or provide access to the Internet, an intranet, an extranet, or the like. Communications network 1470 may provide user access for computing system 1100 with means of communicating and transferring software and information electronically. Additionally, communications network 1470 may provide for distributed processing, which involves several computers and the sharing of workloads or cooperative efforts in performing a task. It is appreciated that the network connections shown are exemplary and other means of establishing communications links between computing system 1100 and remote users may be used.

Network adaptor 1165 may communicate to and from network 1170 using any available wired or wireless technologies. Such technologies may include, by way of non-limiting example, cellular, Wi-Fi, a wireless communication technology such as Bluetooth®, infrared, or the like.

It is appreciated that exemplary computing system 1100 is merely illustrative of a computing environment in which the herein described systems and methods may operate, and does not limit the implementation of the herein described systems and methods in computing environments having differing components and configurations. That is to say, the inventive concepts described herein may be implemented in various computing environments using various components and configurations.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. An apparatus for applying a print plan for making an additive manufacturing print, comprising:

a first print head;

a second print head;

an infrared actuator; and a computing system comprising:

one or more processors; and memory storing instructions that, when executed by the one or more processors, causes the one or more processors to perform operations of:

FDM printing, via the first print head and according to the print plan, an outer contour object comprising a bead of melted filament which then hardens;

FDM printing, via the second print head and according to the print plan, a plurality of raster runs within the outer contour object, comprising beads of infrared actuatable melted filament which then harden, wherein the hardened raster runs have a plurality of gaps; and heating, via the infrared actuator, at least a portion of the hardened raster runs to flow said portion of hardened raster runs to fill at least a portion of the gaps.

2. The apparatus of claim 1, wherein the plurality of gaps include edge gaps, turnaround gaps and intra-run gaps.

3. The apparatus of claim 1, wherein the operations do not include depositing an anti-heat agent.

* * * * *